March 25, 1952  G. W. HOLMES  2,590,537
TRACTOR MOWING ATTACHMENT
Filed March 4, 1946  7 Sheets-Sheet 1

Inventor
Gray W. Holmes

By Clarence A. O'Brien
and Harvey B. Jacobson
Attorneys

March 25, 1952  G. W. HOLMES  2,590,537
TRACTOR MOWING ATTACHMENT
Filed March 4, 1946  7 Sheets-Sheet 2

Inventor
Gray W. Holmes

By Clarence A. O'Brien
and Harvey B. Jacobson
Attorneys

March 25, 1952      G. W. HOLMES      2,590,537
TRACTOR MOWING ATTACHMENT
Filed March 4, 1946      7 Sheets-Sheet 3

Inventor
Gray W. Holmes
By Clarence A. O'Brien
and Harvey B. Jacobson
Attorneys

March 25, 1952  G. W. HOLMES  2,590,537
TRACTOR MOWING ATTACHMENT
Filed March 4, 1946  7 Sheets-Sheet 4

Inventor
Gray W. Holmes
By Clarence A. O'Brien
and Harvey B. Jacobson
Attorneys

March 25, 1952　　　G. W. HOLMES　　　2,590,537
TRACTOR MOWING ATTACHMENT
Filed March 4, 1946　　　　　　　　　　　　　7 Sheets-Sheet 5

Inventor
Gray W. Holmes
By Clarence A. O'Brien
and Harvey B. Jacobson
Attorneys

Patented Mar. 25, 1952

2,590,537

UNITED STATES PATENT OFFICE 2,590,537

TRACTOR MOWING ATTACHMENT

Gray W. Holmes, Miller, Mo.

Application March 4, 1946, Serial No. 651,898

8 Claims. (Cl. 56—25)

1

This invention relates to a tractor mowing attachment and more particularly to a device adapted to be mounted on a farm tractor to be used as a mowing machine.

The primary object of the invention is to convert a farm tractor into a mowing machine and avoid the necessity of attaching a separate mowing machine to the tractor.

Another object is to avoid injury to the sickle and sickle bar in event of it coming in contact with an obstacle such as a boulder or tree trunk.

A further object is to gauge the height of the sickle and sickle bar above the ground and thus regulate the height of the stubble which remains standing after mowing operation.

A still further object is to control the various movements of the mowing attachment with relation to the tractor from a position adjacent the driver's seat and steering wheel of a conventional tractor.

The above and other objects may be attained by employing this invention which embodies among its features a frame adapted to be suspended transversely between the front and rear wheels of a farm tractor having a power take-off, a sickle bar and sickle carried by the frame and extending outwardly from one end thereof in a position to cut a swath to one side of the tractor and means establishing driving connection between the power take-off and the sickle.

Other features include means for adjusting the height of the frame with relation to the tractor and regulating the tilt of the frame as well as the inclination of the sickle bar with relation to the frame and the tractor.

Still other features include means for automatically stopping upward or downward movement of the sickle bar and sickle, when an obstacle is encountered thereby, in order to avoid injury to the sickle and sickle bar.

2

Referring to the drawings in detail, a farm tractor of conventional form designated generally 25 is equipped with the customary forward supporting wheels 26, rear traction wheels 27, driver's seat 28 and steering wheel 29. Mounted at the rear end of the tractor 25 and connected with the usual power source is a conventional power-take-off 30 which is provided with a universal joint 31 to which one end of a telescopic drive shaft 32 is connected.

Rigidly supported by the chassis of the tractor 25 on one side, between the front wheels 26 and the rear wheels 27 is a bracket 33 upon which the cylinder 34 of a double acting reciprocating hydraulic motor is rigidly supported. Extending horizontally from opposite sides of the cylinder 34 parallel with the longitudinal axis of the tractor 25 are supporting arms 35 carrying adjacent their free ends vertically disposed guide sleeves 36, the purpose of which will more fully hereinafter appear.

Secured to the side of the chassis of the tractor 25 opposite to that to which the bracket 33 is attached is a bracket 37 to which the cylinder 38 of a double-acting reciprocating hydraulic motor is pivotally connected as at 39 for oscillatory motion about a horizontal axis which lies parallel to the longitudinal axis of the tractor. Like the cylinder 34, the cylinder 38 is provided with diametrically opposed outwardly extending arms 40 which are provided with vertical sleeves 41 corresponding to the sleeves 36 previously described.

Mounted for vertical sliding movement in the sleeves 36 and 41, are the side bars of H-shaped frames 42 and 42' to the respective cross bar of each of which is yieldingly connected a piston rod 43 and 43' each carrying at its upper end a piston working in its respective cylinder 34 and 38. Formed at the lower end of each side bar of the H-frames 42 and 42' are bearings 44 and 44' the axes of which lie parallel with the longitudinal axis of the tractor 25.

Figures 4, 5, 6:
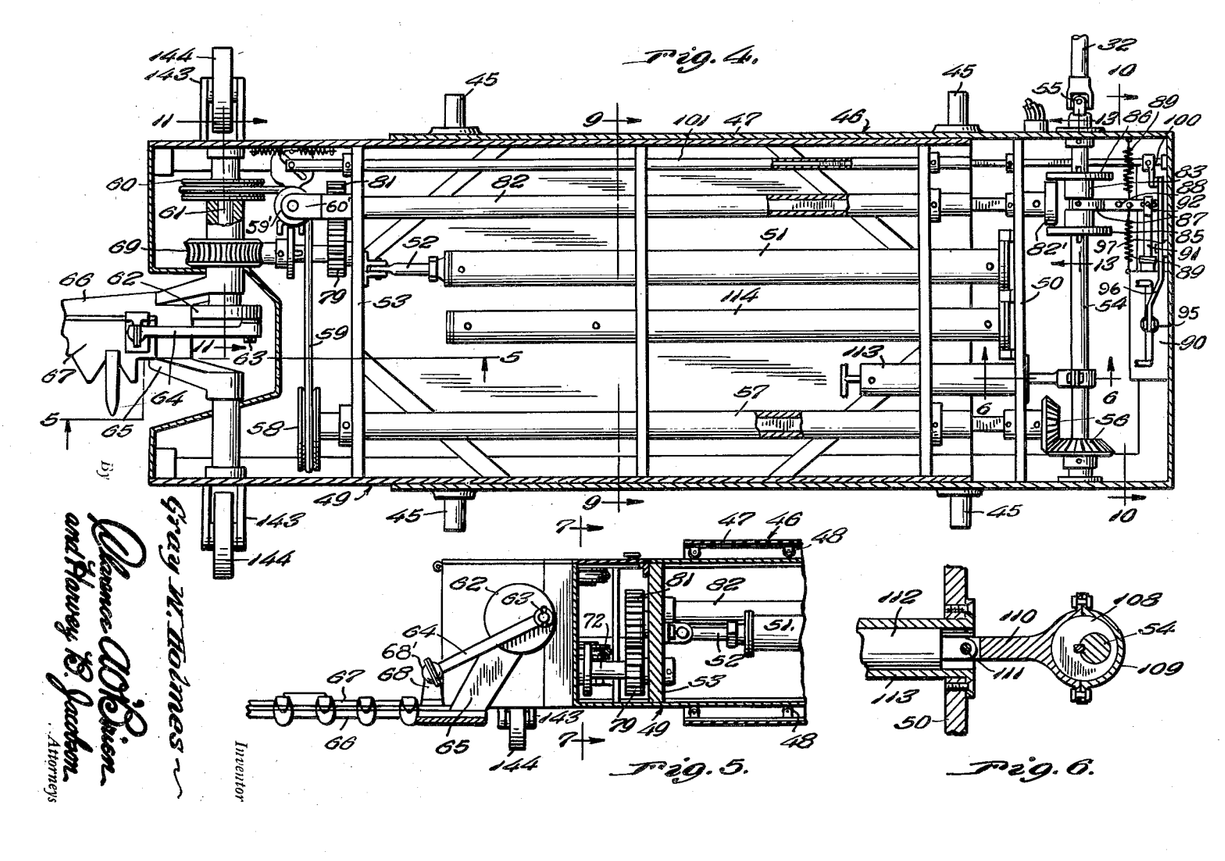
Figure 4 is an enlarged view showing the attachment frame in horizontal section and associated parts in plan and partly broken away and in section.
Figure 5 is a sectional view taken substantially on the line 5—5 of Figure 4.
Figure 6 is an enlarged sectional view taken substantially on the line 6—6 of Figure 4.
Figure 7:
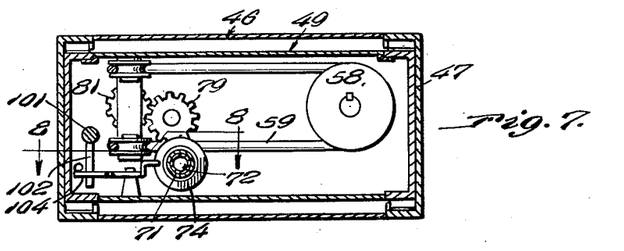
Figure 7 is a transverse sectional view taken substantially along the line 7—7 of Figure 5.
Figure 11:
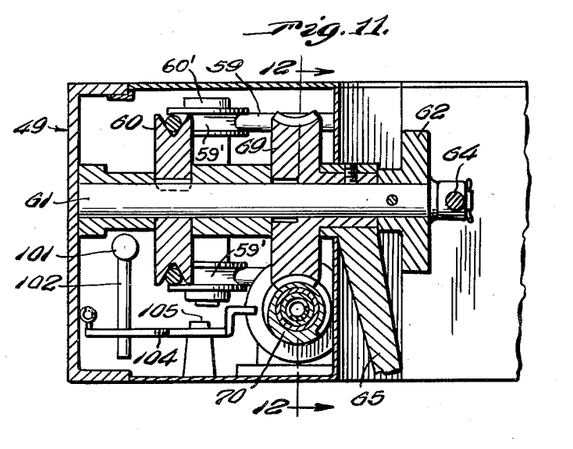
Figure 11 is a fragmentary enlarged sectional view taken substantially along the line 11—11 of Figure 4.
Figure 12:
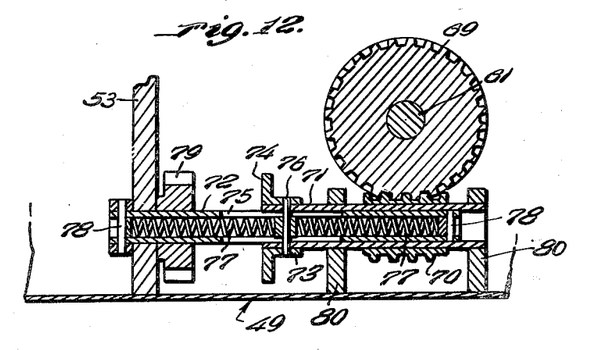
Figure 12 is a sectional view taken substantially on the line 12—12 of Figure 11.

Pivotally supported on outwardly extending trunnions 45, which are received in the bearings 44 and 44', is the main mower supporting and control frame designated generally 46. This frame 46 comprises a hollow box-like structure 47 carrying at spaced intervals on its top and bottom sides bearing rollers 48 upon which a sub-frame, designated generally 49, is mounted to telescope into the main frame 46. Fixed to a cross member 50 extending transversely of the main frame 46 near one end, is the hydraulic cylinder 51 of a double-acting reciprocating hydraulic motor containing a piston to which one end of a piston rod 52 is attached, and the opposite end of piston rod 52 is connected to a cross member 53 extending transversely of the sub-frame 49. It will thus be seen that the sub-frame may be moved into various adjusted positions within the main frame so as to advance or retract the mower to be more fully hereinafter described, transversely of the longitudinal axis of the tractor 25. Mounted to rotate in the main frame 46, between the cross member 50 and the end of said frame, is a main shaft 54 provided at one end with a universal joint 55, which is connected to the shaft 32 so as to be driven by the power take-off 30 of the tractor 25. Driven by bevelled gearing 56 from the main shaft 54 is a longitudnally extending telescopic shaft 57, one end of which is journaled in the cross member 50, while its opposite end is journaled in the cross member 53. A drive pulley 58 is attached to the end of the telescopic shaft 57 adjacent the cross member 53 and has driving connection through the medium of a belt 59 with a drive pulley 60 mounted on a shaft 61 which extends transversely of the subframe 49 between the outer end thereof and the cross member 53. The upper and lower flights of the belt 59 are entrained over vertically spaced idler pulleys 59' (see Figures 4, 7 and 11) carried by a suitable bracket 60' fixedly secured to the cross member 53. This shaft 61 carries at one end, a crank disc 62 carrying a crank pin 63 to which one end of a pitman or connecting rod 64 is attached. Mounted for rotation in the frame 49 between the end of the frame and the cross member 53, and extending transversely of the frame is a yoke 65 supporting a sickle bar 66 upon the upper side of which is mounted for longitudinal sliding movement, a sickle 67. The end of the sickle 67 adjacent the end of the subframe 49 carries an upstanding bracket 68 to which the end of the connecting rod 64 opposite that connected to the crank pin 63 is attached by a universal joint 68' for universal movement. Attached to the yoke 65, in such a manner as to cause it to rotate about the longitudinal axis of the shaft 61 is a worm gear 69 which has meshing engagement with a worm 70 carried by a sleeve 71 (Fig. 12) mounted for longitudinal sliding movement on a tubular shaft 72 and carrying at one end a sleeve 73 provided with an outstanding annular flange 74. The tubular shaft 72 is formed with diametrically opposed longitudinal slots 75 and extending through the sleeve 71 and the slots 75 is a pin 76. It will thus be seen that the sleeve 71 may slide longitudinally of the shaft 72, but will be rotated in unison therewith. Compression coil springs 77 are fitted within the tubular shaft 72 on opposite sides of the pin 76, and each spring bears against a cross pin 78 which extends transversely through the shaft 72 adjacent each end. It will thus be seen that the sleeve 71 will be yieldingly held in a predetermined position longitudinally of the shaft 72, so that the sleeve 71 will shift on the shaft 72 to an extent determined by the direction of the amount of axial thrust on the worm 70 due to the interaction of the worm wheel 69 and the worm 70. A drive pinion 79 is attached to the shaft 72 adjacent the cross member 53 while the sleeve 71 is journaled in suitable brackets 80 carried by the frame member 49 in spaced relation to opposite ends of the worm 70. The drive pinion 79 has meshing engagement with a drive pinion 81 which is carried at one end of a longitudinally extending telescopic shaft 82. This shaft is journaled to rotate in the cross members 50 and 53 respectively and attached to the end of the shaft 82 opposite that carrying the drive pinion 81 is a friction disc 82'.

Figure 13:
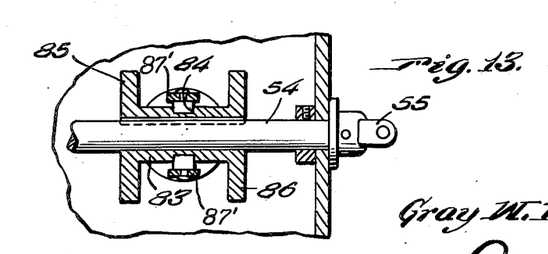
Figure 13 is a fragmentary enlarged sectional view taken substantially along the line 13—13 of Figure 4.
Figure 14:
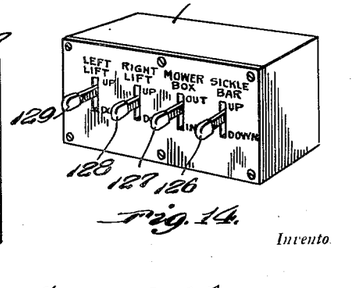
Figure 14 is a perspective view of the control box showing the control levers extending through one side thereof.
Figure 15:
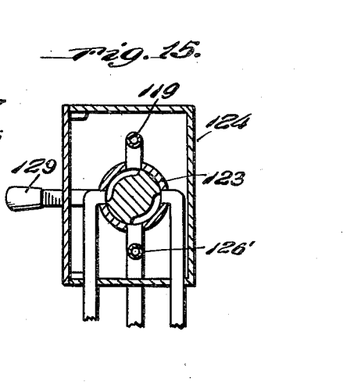
Figure 15 is an enlarged transverse sectional view taken through the control box illustrating one of the control valves in section.
Figure 16:
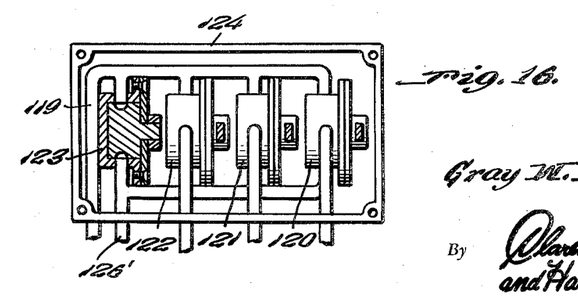
Figure 16 is an enlarged front view of the control box with the cover removed and illustrating one of the control valves in section.

Mounted for longitudinal sliding movement on the shaft 54, but rotatable therewith is a sleeve 83 which is formed midway of its length with an annular groove 84 and carries at opposite ends friction discs 85 and 86, respectively. A fork 87 including legs 87' is pivoted at 88 upon a support, not shown, carried by the frame 46 to swing about a vertical axis, with its legs 87' engaging the walls of the annular groove 84 (see Figure 13) so that as the fork is moved one or the other of the friction discs 85 or 86 will be moved into contact with the friction disc 82' in order to impart driving action to the shaft 82 and through the medium of the pinions 81 and 79 will drive the shaft 72 to cause rotation of the worm gear 69 and a consequent raising or lowering of the sickle bar 66 and sickle 67 by the yoke 65. The fork 87 is normally held in a neutral position by means of retractile coil springs 89 suitably secured to the frame 46. In order to effect automatic stopping of the motion of the sickle and sickle bar about the axis of shaft 61 when the control lever therefor is shifted, I provide at the end of the main frame 46, adjacent the shaft 54 a hydraulic cylinder 90 of a double-acting reciprocating hydraulic motor containing a piston 95' to which one end of a piston rod 91 is attached. The opposite end of the piston rod 91 is pivoted as at 92 to the end of the fork 87 opposite that which engages the sleeve 83. The cylinder 90 is provided adjacent opposite ends with ports to which pipes 93 and 94 lead. These pipes are connected to a by-pass control valve assembly 95 more fully described hereinafter, and by means of which fluid may be permitted to pass from one side of the piston 95' to the other side of the piston 95'. A lever 96 is connected to the control stem 96' of the valve 95 and is mounted to rock about a pivot 97 carried by the end of the frame 46. The opposite end of the lever 96 is pivotally connected as at 98 to a link 99, while the remote end of the latter is pivoted at 100' to one end of an arm 100 carried at one end of a telescopic shaft 101 which is mounted for oscillatory motion in the cross members 50 and 53. The end of the shaft 101 opposite that carrying the lever arm 100 is provided with a depending control pin 102, the lower end of which is received in a diagonal slot 103 formed near one end of a lever 104 which is pivoted as at 105 to swing about a vertical axis near the annular flange 74. The end of the lever 104 opposite that carrying the slot 103 is forked as at 106 to partially embrace the flange 74, so that as the sleeve 71 moves longitudinally of the shaft 72 the lever 104 will be rocked about its pivot 105. Suitable retractile coil springs 107 have their adjacent ends connected as at 107' to the lever 104 and are secured at their remote ends to the side of the frame 49 as at 107" in order to hold the lever 104 in a neutral position. Mounted at any convenient point on the drive shaft 54 is an eccentric 108 which is surrounded by an eccentric strap 109 carried by one end of a connecting rod 110. The opposite end of the connecting rod 110 is pivoted as at 111 to one end of a piston 112 which works in a cylinder 113 disposed in the frame 46 and carried by the cross member 50, and these parts function continuously when the shaft 54 is in motion as a pump for the hydraulic fluid which serves to operate the various elements of the device.

Mounted in the frame 46 and suitable secured to the cross member 50 is a fluid pressure reservoir 114 provided at one end with a fluid inlet port 115. Slidably mounted in the reservoir 114 is a head 116 which is yieldingly urged toward the end of the reservoir containing the inlet port 115 by means of a compression coil spring 117. The inlet port 115 is connected with the discharge port of the pump 113 through the medium of the feed pipe 118 and communicating with the pipe 118 and port 115 is a fluid pressure pipe 119 leading to valves 120, 121, 122 and 123, which are contained in a control box 124, mounted in a convenient position to be readily reached by the driver of the tractor. An expansion chamber 125 is also connected to the discharge ports of the valves 120, 121, 122 and 123, respectively, through the medium of a return pipe 125' which also leads through a branch pipe 127' to the intake port of the pump 113. The valves 121, 122, and 123 are of the four-way type as clearly shown in Figure 17 and are provided respectively with control handles 127, 128 and 129. Vertical adjustment of the frame 46 may be had by manipulating the levers 128 and 129 so that when the levers 128 and 129 are moved upwardly, for instance, the fluid under pressure in the cylinder 114 will flow through the pipe 119, valves 122 and 123 respectively to the under sides of the pistons in the cylinders 34 and 38. Obviously, as these valves are independently controllable, the degree of elevation of either end of the frame 46 may be regulated in accordance with the desire of the user. The extent to which the sub-frame 49 extends beyond the main frame 46 may be regulated by adjusting the handle 127 of the valve 121.

Figure 17:
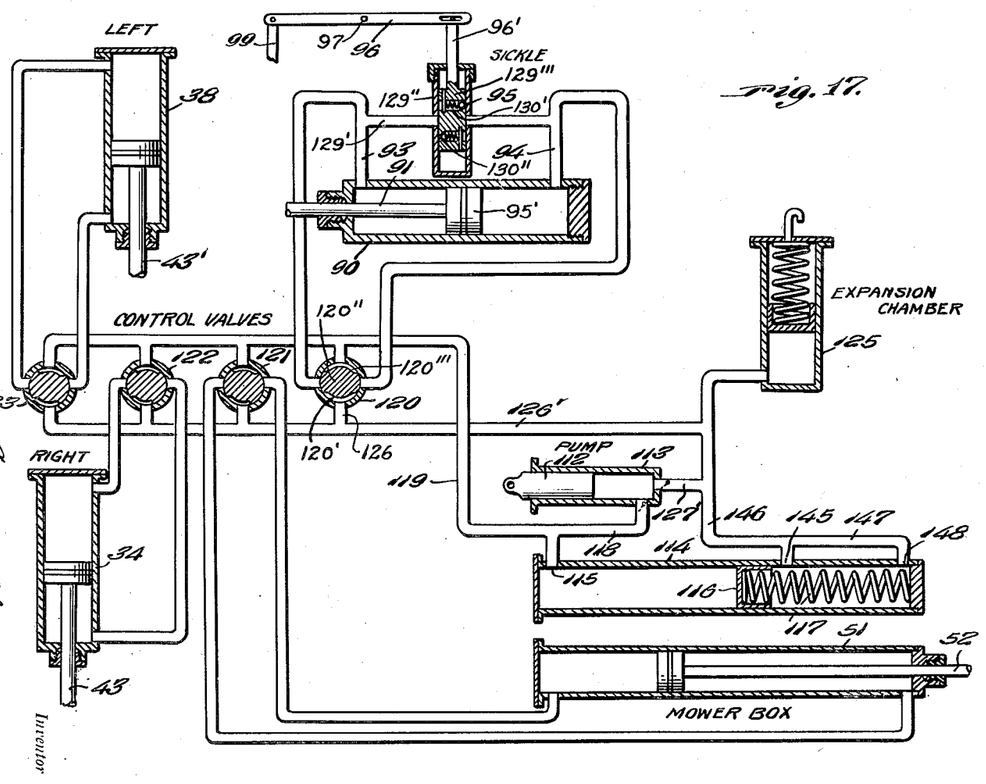
Figure 17 is a diagrammatic view showing the piping system and control mechanism.

It will be seen upon inspection of Figure 17 that valve 120 differs from the four-way valves 121—123 in that the groove 120' in the core 120" thereof extends approximately 180° around the circumference of the core so that when the latter is in the position shown in Figure 17, the pipe 126' has communication with both of the pipes 93 and 94 through the groove 120' so that equal fluid pressures will be exerted on both sides of the piston 95'. Like valves 121—123, the valve 120 is provided with a control handle 126, and the latter is in the neutral position when valve 120 is in the position shown in Figure 17. Shifting of the handle 126 in one direction from such neutral position will move the core 120" to such a position that the groove 120' will afford communication only between the pipe 126' and one of the pipes 93 and 94, while the other groove 120''' will afford communication between the pipe 119 and the other of the pipes 93 and 94. The purpose of such an arrangement will appear presently.

Directing attention to the valve assembly 95, it will be seen that the latter comprises a by-pass pipe 129' connecting the pipes 93 and 94 and in which is disposed a housing 129" having a core 129''' threaded therein for reciprocation. The core 129''' with a pair of spaced passage ways provided with oppositely arranged spring pressed ball check valves 130' and 130" therein, the arrangement being such that the core 129''' may be placed in any of three positions, that is, a position permitting flow of fluid in the pipe 129' in one direction only, a second position permitting flow of fluid in the pipe 129' in the opposite direction only, and a third position intermediate the first two positions where the core 129''' blocks the movement of fluid through the pipe 129'.

Figure 18:
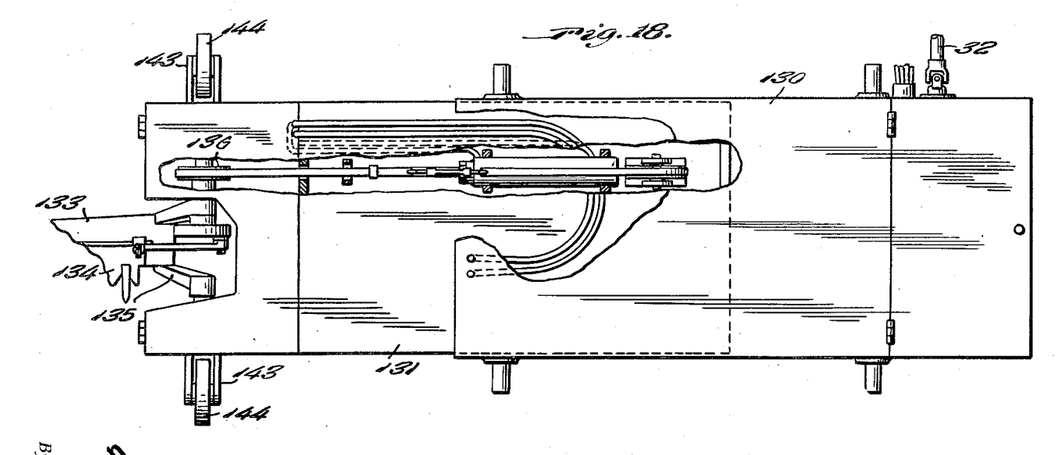
Figure 18 is a view similar to Figure 4 showing a modified form of the invention.
Figure 19:
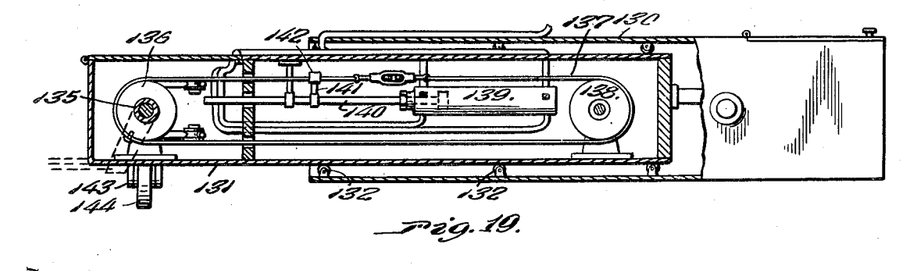
Figure 19 is a side view of Figure 18, certain portions being shown in section to more clearly illustrate the details of construction.

In the modified form of the invention illustrated in Figures 18 and 19, the main frame 130 is suspended in the same manner as the main frame 46, previously described, and the sub-frame 131 is mounted for longitudinal sliding movement in the main frame 130 on rollers 132 in substantially the same manner as the sub-frame 49 is mounted. The sickle bar 133 and sickle 134 are mounted in the sub-frame in the same manner as the sickle and sickle bar previously described and also the sickle is driven as previously set forth. Instead, however, of employing the worm and worm wheel for controlling the elevation of the sickle and sickle bar, I attach to the yoke 135 carrying the sickle and sickle bar a pulley 136 over which a cable 137 is trained. This cable operates over an idler pulley 138 carried at the end of the frame 131 opposite the yoke 135, and mounted within the frame 131 is a cylinder 139 containing a piston from one end of which projects a piston rod 140. This piston rod is slidable longitudinally of the frame and carries a bracket 141 upon which is mounted a clamp sleeve 142 which has clamping engagement with the upper run of the cable 137. It will thus be seen that as the piston moves within the cylinder 139, pull will be exerted on the cable 137 through the medium of the clamp sleeve 142 so that the cable will move in unison with the piston rod 140 and cause the pulley 133 to rotate the yoke 135 about its axis to raise or lower the sickle and sickle bar.

Each frame 49 and 131, is provided on opposite sides with outstanding brackets 143, in which gauge wheels 144 are rotatably supported to rotate about an axis perpendicular to the longitudinal axis of the tractor to which the device is attached.

Figure 1:
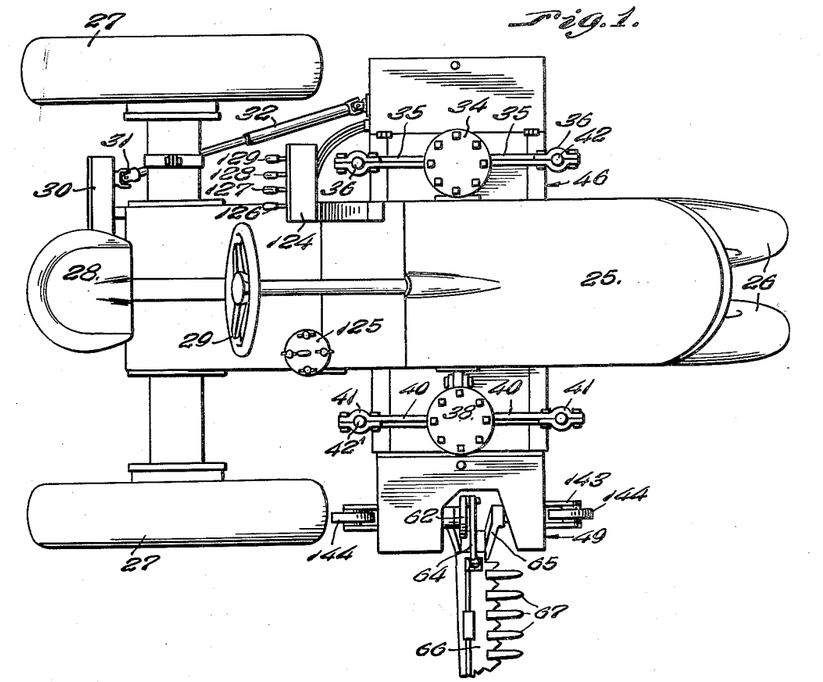
Figure 1 is a top plan view of a farm tractor showing this improved attachment in place thereon.
Figure 2:
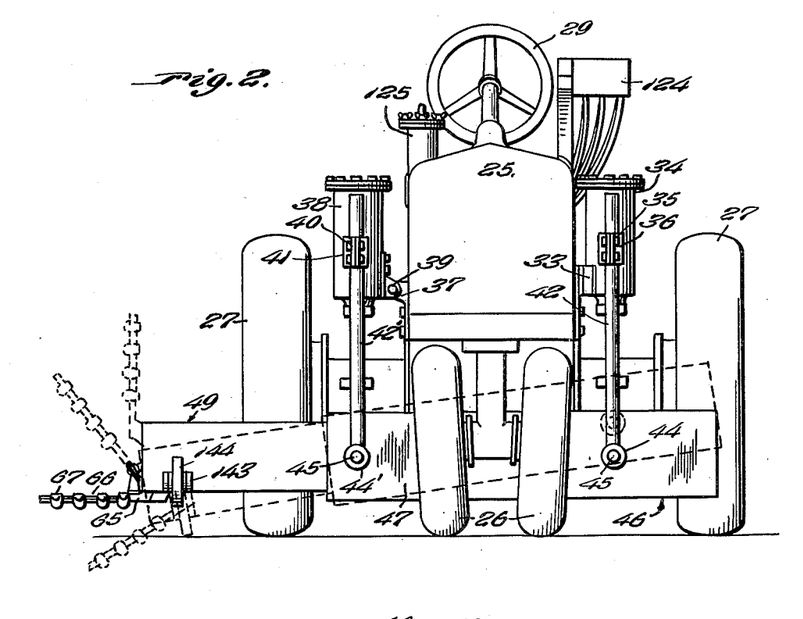
Figure 2 is a front view in elevation of the tractor illustrated in Figure 1.
Figure 3:
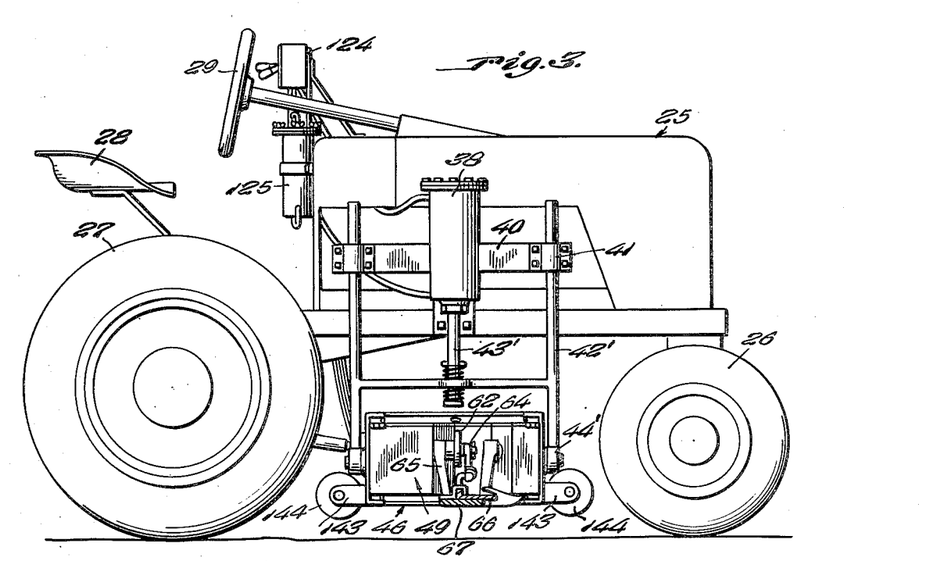
Figure 3 is a side view of the tractor and attachment.
Figure 8:
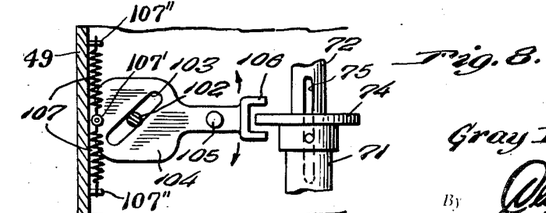
Figure 8 is a fragmentary enlarged sectional view taken substantially along the line 8—8 of Figure 7.
Figure 9:
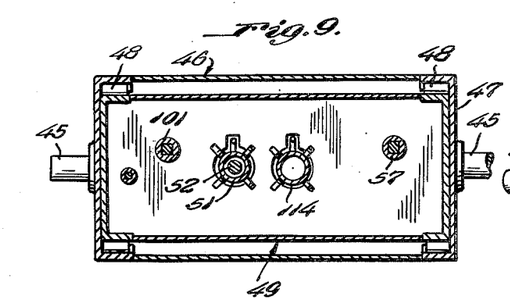
Figure 9 is a transverse sectional view taken substantially along the line 9—9 of Figure 4.
Figure 10:
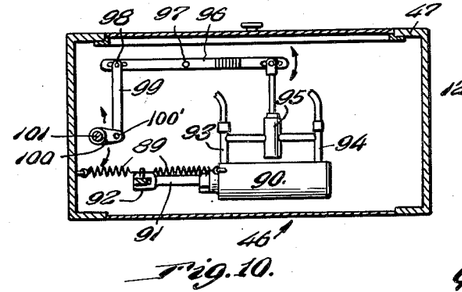
Figure 10 is a sectional view taken substantially along the line 10—10 of Figure 4.

In operation, the device is attached to the tractor as previously described so that the piston rods 43 and 43' slide vertically in the cylinders 34 and 36. By manipulating the valve levers 128 and 129, the pistons in the cylinders 34 and 36 will be moved to raise or lower the frame 46, and also to cause it to tilt to the desired angle as illustrated in the dotted lines in Figure 2. A lever 127 is next moved to control the movements of the valve 121 so as to adjust the frame 49 longitudinally of the frame 46 until the desired position is attained. Manipulation of the lever 126 will operate the valve 120 to move the sickle bar into the desired position, it being understood that the sickle bar must be turned into a vertical position during the transportation of the attachment from one field to another and then lowered to a horizontal position for conducting the mowing operation. Of course, as the power take-off 30 is connected with the power source of the tractor 25, the shaft 32 will be rotated thereby imparting rotary motion to the shaft 54. This in turn, continuously operates the pump 113 so as to pump the pipe 119 full of hydraulic fluid and store the fluid under pressure in the reservoir 114. As the pressure in the reservoir increases, the head 116 will move against the pressure of the spring 117 until such time as the head passes the port 145 when the pressure will be bi-passed into the pipe 146 back to the pump through the pipe 127. Simultaneously, with the bi-passing of the pressure through the pipe 146, the fluid will also flow through the pipe 147 to the port 148 in the reservoir 114 to counterbalance the pressure on the head 116 and permit it to return under the influence of the spring 117 to seal the port 145. In this way a high degree of hydraulic pressure is built up in the pipe 119 and in event that the fluid expands, such expansion may be taken care of in the expansion chamber 125. When the sickle bar and sickle are positioned as desired, the valve 120 is in the position shown in Figure 17, so that both ports at the ends of the cylinder 90 are open to the return pipe 126' and the pressure is balanced on both sides of the piston operating within the cylinder 90 so that driving connection between the shafts 54 and 82 is broken, however, the sickle and sickle bar may be raised or lowered by suitable movement of the handle 126. Should an obstacle be encountered by the sickle and sickle bar, such as a bolder, tree stump or fence post, during vertical adjustment thereof, the drive to the yoke 65 will be loaded to such an extent that interaction of the worm wheel 69 and the worm 70 will cause the latter to shift longitudinally on the tubular shaft 72 and cause the sleeve 71 and flange 74 to move longitudinally with the result that the flange 74 will engage the fork 106 (Fig. 8) and rock the lever 104 about the pivot 105. Such movement causes the walls of the slot 103 to engage the pin 102 so as to rock the shaft 101 (Fig. 4) about its longitudinal axis which will swing the arm 100 about the longitudinal axis of the shaft 101 to rock the lever 96 (Fig. 17) and thus move the core 129''' of the valve 95 to bring one of the passageways in the core 129''' into alignment with the pipe 129' connecting the pipes 93 and 94. This action permits the pressure on opposite sides of the piston 95' to equalize, whereupon the latter shifts to its neutral position through the action of the springs 89, whereby the sleeve 83 is moved to disengage the friction disk 82' from contact with either of the friction disks 85 and 86 to interrupt the drive to the yoke 65. For example, assume the valve 120 is set to lower the sickle bar by admitting pressure to the pipe 93 and that the sickle bar encounters an obstacle.

The resistance to the movement of the yoke 65 thus brought about will cause the worm 70 to travel axially, rather than to rotate the worm wheel 69, such movement of the worm 70 being outwardly from the tractor so as to cooperate with the flange 74, the lever 104, the pin 102, the shaft 101, the crank arm 100, the link 99, and the lever 96 cause the core 129''' to raise from the neutral position thereof shown in Figure 17 until the passageway and valve 130'' is in registry with the pipe 129', whereupon pressure will be equalized on both sides of the piston 95' to discontinue the drive as explained above. The manner in which the drive is discontinued when the sickle bar encounters resistance upon being raised will be understood without further explanation, except to point out that in this situation the core 129''' will lower until the passageway and valve 130' is in registry with the pipe 129'.

The opposite arrangement of valves 130' and 130'' permits reverse driving of the yoke 65 after the drive thereto has been automatically interrupted in one direction, as will be apparent.

A further function of the yieldingly resisted axial movement of the worm 70 resides in the fact that the same serves as a shock absorber and affords a folding support for the sickle bar when the latter is in the operative position.

While in the foregoing there has been shown and described the preferred embodiment of this invention it is to be understood that minor changes in the details of construction, combination and arrangement of parts may be resorted to without departing from the spirit and scope of the invention as claimed.

What I claim is:

1. In a mower attachment for tractors, a double-acting reciprocating hydraulic motor including a cylinder rigidly mounted in a vertical position at one side of the tractor and having a downwardly projecting piston rod, a second double-acting reciprocating hydraulic motor including a cylinder pivotally mounted at the other side of the tractor to tilt transversely of the latter and having a downwardly projecting piston rod, a frame assembly disposed transversely of the tractor between the front and rear wheels thereof, a pair of guide sleeves rigidly attached to and respectively disposed forwardly and rearwardly of the cylinder of each of said motors, frames disposed at opposite sides of the tractor and each including side bars slidable in the pair of guide sleeves attached to the adjacent cylinder and pivoted at their lower ends to said frame assembly, each frame also including a cross bar connected to the piston at the adjacent side of the tractor, a sickle bar carried by one end of said frame assembly and projecting laterally from the adjacent side of the tractor, a sickle slidably mounted on said sickle bar, power-driven means carried by said frame assembly for reciprocating said sickle, and means operable from the driver's seat of the tractor for independently controlling the operation of said motors.

2. In a mower attachment for tractors having a power take-off, an elongated frame assembly, means to mount said frame assembly on and transversely of the tractor between the front and rear wheels thereof, a transverse horizontal shaft journaled in one end of said frame assembly, a yoke journaled on said shaft, a sickle bar fixed to said yoke, a sickle slidable on said sickle bar, means operatively connecting said shaft to said sickle to reciprocate the latter, driving mechanism for said shaft carried by said frame assembly and adapted to be operatively connected to said power take-off at the other end of said frame assembly, driving mechanism for said yoke carried by the frame assembly, a releasable and reversible driving connection between said first-named driving mechanism and said second-named driving mechanism at said other end of the frame assembly, a double-acting reciprocating hydraulic motor carried by said frame assembly and selectively operable to release or reverse said driving connection, and means operable from the driver's seat of the tractor for controlling the operation of said motor.

3. The construction defined in claim 2, wherein said driving mechanism for the yoke includes a reciprocable element movable in response to load on such driving mechanism, and means operable by a predetermined movement of said element to render said motor operative to release said driving connection.

4. The construction defined in claim 2, wherein the frame assembly includes a main frame mounted on the tractor and a subframe slidable in and projecting from one end of the main frame, said transverse shaft being journaled in the subframe, a double-acting reciprocating hydraulic motor arranged within and interposed between the main frame and the subframe for projecting and retracting the latter relative to the former, and means operable from the driver's seat of the tractor for controlling the operation of said last-named motor, said driving mechanisms including telescopic shafts arranged longitudinally of and within said frame assembly.

5. In a mowing machine, a frame and a sickle bar pivoted to the frame for vertical swinging movement, a driving member, driving means for raising and lowering the sickle bar, a releasable and reversible driving connection between the driving member and the driving means, manually operable means for selectively controlling said driving connection, and means responsive to a predetermined overload on said driving means to release said driving connection, said driving means including a worm and a worm wheel so constructed and arranged to prevent reverse operation of the driving means through the action of the sickle bar, so that the vertical position of sickle bar will remain substantially unchanged when the driving connection is released.

6. In a mowing machine, a frame and a sickle bar pivoted to the frame for vertical swinging movement, a driving member, driving means for raising and lowering the sickle bar, a releasable and reversible driving connection between the driving member and the driving means, manually operable means for selectively controlling said driving connection, and means responsive to a predetermined overload on said driving means to release said driving connection, said driving means including a worm wheel operatively connected to the sickle bar, a worm meshed with the worm wheel and mounted for axial reciprocation on the frame, spring means yieldingly urging the worm towards a neutral position, said overload responsive means being operatively connected to the worm.

7. In combination, a tractor having a power take-off, a pair of vertically disposed double acting reciprocating hydraulic motors mounted on opposite sides of the tractor, a main frame transversely disposed below the tractor and operatively connected at spaced positions to said motors, means for selectively operating each of the motors so that the main frame may be selectively raised and tilted, a subframe carried by the main frame for reciprocation laterally from the tractor, a sickle bar pivoted to the subframe for vertical swinging movement, a rotatable driving member carried by the main frame, a flexible drive connecting the power take-off and the driving member, telescopic driving means for raising and lowering the sickle bar, a releasable and reversible driving connection between the driving member and the driving means, manually operable means for selectively controlling said driving connection, means responsive to a predetermined overload on said driving means to release said driving connection, and a double acting reciprocating hydraulic motor connecting the frames.

8. The combination of claim 7 including a hydraulic pump carried by the main frame, means drivingly connecting the rotatable member to the pump, said pump being operatively connected to all of said hydraulic motors.

GRAY W. HOLMES.

REFERENCES CITED

The following references are of record in the file of this patent:

UNITED STATES PATENTS

| Number | Name | Date |
| --- | --- | --- |
| 1,570,415 | Sumbulian | Jan. 19, 1926 |
| 1,953,394 | Clapper | Apr. 3, 1934 |
| 2,129,435 | Morris | Sept. 6, 1938 |
| 2,177,803 | Ferte et al. | Oct. 31, 1939 |
| 2,187,981 | Martin | Jan. 23, 1940 |
| 2,206,283 | Jacobs et al. | July 2, 1940 |
| 2,289,598 | Sladecek | July 14, 1942 |
| 2,291,987 | Rogers | Aug. 4, 1942 |
| 2,292,962 | Mott | Aug. 11, 1942 |
| 2,304,421 | Rogers | Dec. 8, 1942 |
| 2,310,387 | Blair et al. | Feb. 9, 1943 |
| 2,419,331 | Best | Apr. 22, 1947 |
| 2,422,044 | Ronning et al. | June 10, 1947 |
| 2,452,153 | Ronning et al. | Oct. 26, 1948 |
| 2,457,693 | Leicy | Dec. 28, 1948 |
| 2,483,772 | Holmes | Oct. 4, 1949 |
| 2,489,065 | Whited | Nov. 22, 1949 |
| 2,496,608 | Thomas | Feb. 7, 1950 |